(12) United States Patent
Shin et al.

(10) Patent No.: US 7,723,675 B2
(45) Date of Patent: May 25, 2010

(54) WELL TYPE NEUTRON COUNTER CONTAINING AN ANNULAR HE-3 DETECTOR TUBE

(75) Inventors: Hee Sung Shin, Daejeon (KR); Myung Kook Moon, Daejeon (KR); Tae Hoon Lee, Daejeon (KR); Kwang Jun Park, Daejeon (KR); June Sik Joo, Daejeon (KR); Jung Hwan Jung, Daejeon (KR); Ho Dong Kim, Daejeon (KR); Ji Sup Yoon, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 173 days.

(21) Appl. No.: 12/153,607

(22) Filed: May 21, 2008

(65) Prior Publication Data
US 2009/0166556 A1      Jul. 2, 2009

(30) Foreign Application Priority Data
Dec. 26, 2007   (KR) ................ 10-2007-0137998

(51) Int. Cl.
G01N 23/12   (2006.01)
G01T 3/00    (2006.01)
G01V 5/10    (2006.01)

(52) U.S. Cl. ............... 250/256; 250/264; 250/269.4; 250/269.5; 250/265; 250/266; 250/390.01; 250/518.1; 376/158

(58) Field of Classification Search ............ 250/253, 250/256, 259, 260–262, 264, 265, 266, 269.1, 250/269.4, 269.5, 269.6, 363.01, 390.01, 250/391–393, 428, 432 R, 496.1, 522.1, 526; 376/156, 158, 189, 245
See application file for complete search history.

(56) References Cited

U.S. PATENT DOCUMENTS

| | | | | |
|---|---|---|---|---|
| 2,462,471 | A | * | 2/1949 | Crumrine .................... 376/155 |
| 3,578,562 | A | * | 5/1971 | Johnson et al. ............. 376/219 |
| 3,898,467 | A | * | 8/1975 | Schukei et al. ......... 250/390.01 |
| 4,483,816 | A | * | 11/1984 | Caldwell et al. ............ 376/158 |
| 5,581,079 | A | * | 12/1996 | Mickael .................... 250/269.4 |
| 7,026,627 | B2 | * | 4/2006 | Fowler et al. ............... 250/394 |
| 2005/0121618 | A1 | * | 6/2005 | Fowler et al. ............... 250/394 |
| 2008/0191140 | A1 | * | 8/2008 | McDevitt et al. ....... 250/390.11 |
| 2009/0108210 | A1 | * | 4/2009 | Stephenson et al. ........ 250/391 |
| 2009/0166556 | A1 | * | 7/2009 | Shin et al. ............... 250/432 R |
| 2009/0236537 | A1 | * | 9/2009 | Wang et al. ................. 250/394 |

* cited by examiner

*Primary Examiner*—Bernard E Souw
(74) *Attorney, Agent, or Firm*—Clark & Brody (57) ABSTRACT

The present invention relates to a well type neutron counter containing a He-3 detector which includes at least one annular gas layer in a polyethylene moderator, which includes a body formed of a neutron moderator and having a sample cavity for inserting a sample of nuclear material therein; and an annular He-3 detector tube including at least one annular gas layer into which at least He-4 or He-3 gas or their mixture is injected and a plurality of anode rods stood in the annular gas layer with an equal spaces, wherein the He-3 detector tube is formed in an inside of the body so as to surround the sample cavity. The neutron counter has a largely reduced size, simplified structure and resultant decreased failure rate as compared to a conventional counter with a large volume.

12 Claims, 8 Drawing Sheets

WELL TYPE NEUTRON COUNTER CONTAINING AN ANNULAR HE-3 DETECTOR TUBE

TECHNICAL FIELD

The present invention relates to a neutron counter for quantitively measuring special nuclear material (SNM), such as U-235 or Pu, which exists in a nuclear material by precise detection of the number of neutron emitted from the nuclear material, and more particularly, to a well type neutron counter containing a He-3 detector which includes at least one annular gas layer in a polyethylene moderator. It is possible to quantitively measure the amount of nuclear material by putting a sample into the sample cavity of the neutron counter and counting neutron.

BACKGROUND ART

In a pyroprocess for firstly separating fission products and secondly separating uranium from other materials after metallization of nuclear material in spent nuclear fuel, it is very important for ensuring nuclear transparency and is the recommendation of International Atomic Energy Agency (IAEA) to measure an amount of the nuclear material in each unit process. In order to quickly and precisely measure the nuclear material of various forms under the severe condition of hot cell in which the pyroprocess is proceeded, a neutron counter should be simplified and have high efficiency.

In general, various nuclear fuel materials include a fissionable material which is capable of nuclear fission. A precise detection for an amount of the fissionable material included in the nuclear fuel material is primarily required to produce nuclear fuel which can be burned in a nuclear reactor. The method for measuring the amount of fissionable material is largely divided into a destructive method and a nondestructive method. The destructive method is a chemical analyzing method and has an advantage of good analysis accuracy. However, it is economically disadvantageous since it takes long time to analyze and thus the destructive method has not been generally used. On the contrary, the nondestructive method is an analyzing method by measuring gamma rays or neutrons and has an advantage that it is capable of real time analysis. However, a gamma ray spectrum analysis has been used only to a new nuclear fuel and a method that quantificates Cm which is a major neutron source by measuring neutrons emitted from the Cm and then quantificates U-235 or Pu based on the quantitificated Cm is used for a fissionable material included in spent nuclear fuel. At that time, a highly efficiently neutron detector is needed.

In recent 1990s, there has been developed a neutron detector tube with good detection efficiency. Such detector tube has been mainly utilized in a technology for measuring plutonium content by a neutron multiplication factor measurement method. Particularly in United States, a large number of studies have been made mainly by Los Alamos National Laboratory, etc. Some of them have been commercialized by measurement equipment makers such as Canberra, and IAEA actually and widely utilizes these products in accounting for and control of nuclear material and inspection activity.

However, in the aforementioned neutron detector tube, since the measurement result may be overestimated due to induced fission in a sample and resultant neutron multiplication when there is a high sample density or a much sample amount, there is a difficulty that a multiplication factor for every sample should be known in advance to correct the result. In order to improve the difficulty, there has been suggested a method of measuring with exclusion of multiplicated neutrons using a multiplicity mode device (e.g. JSR-14 available from Canberra) with a high efficiency counter. However, an efficiency of the counter should be more than 40% to use the method and a large number of He-3 tube detectors should be contained to obtain such high efficiency. For example, it has been known that approximately 120 He-3 tube detectors should be contained to obtain the efficiency of approximately 60%. When using such large number of He-3 tube detectors, there are problems that it takes much cost and difficulty in installation and maintenance is increased as a scale of equipment is much increased.

Figure 1:
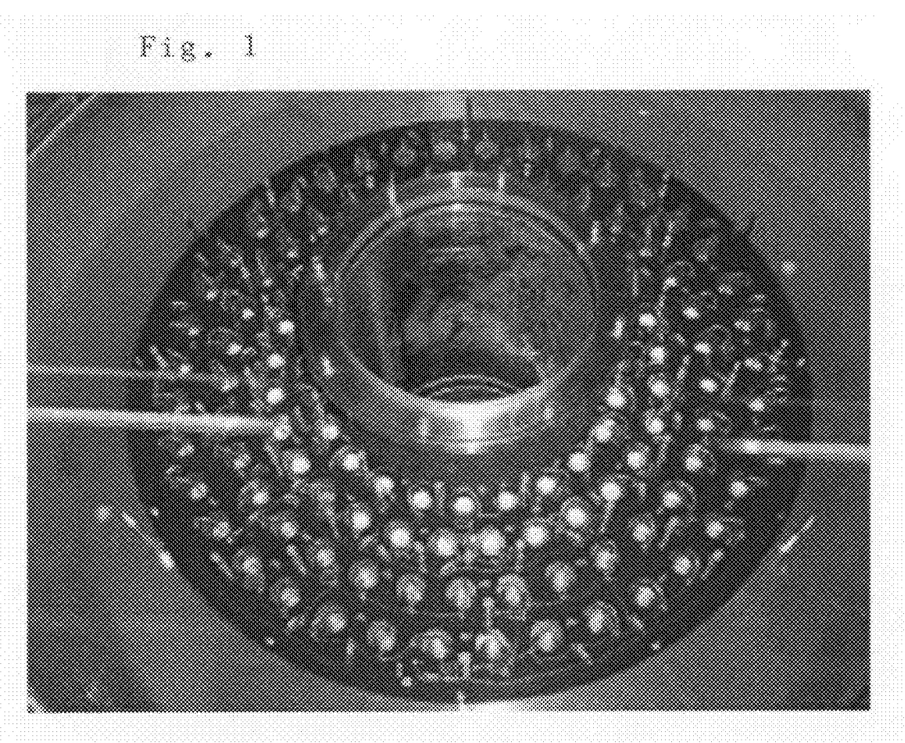
FIG. 1 is a photograph showing a conventional neutron counter provided with a plurality of He-3 tube detectors.

FIG. 1 is a photograph showing a neutron counter, which had been developed and used by Ispara laboratory in Italy and is capable of measuring Pu content in MOX nuclear fuel with a relative error of less than 2%, and in which 125 He-3 tube detectors are contained in the form of four rings and a multiplicity mode is enabled. The counter has a diameter of approximately 96 cm and a weight of approximately 1200 kg but is known to have an efficiency of approximately 50 to 60%. As described above, since such counter requires a large number of He-3 tube detector, its scale is much increased and thus there is a problem that it is not easy to install the counter in a hot cell which is pyroprocessing facility for the spent nuclear fuel and it is also very difficult to maintain the counter.

DISCLOSURE OF THE INVENTION

It is an object of the present invention to provide a high efficient well type neutron counter, which contains an annular He-3 detector tube including at least one annular gas layer.

It is another object of the present invention to provide a compact neutron counter, which has a higher efficiency but has reduced failure rate and simplified shaped with reduced size compared to the conventional counter.

To achieve the above and other objects, the present invention provides a well type neutron counter containing an annular He-3 detector tube, which includes a body formed of a neutron moderator and having a sample cavity for inserting a sample of nuclear material therein; and an annular He-3 detector tube including at least one annular gas layer into which He-3 gas is injected and a plurality of anode rods stood in the annular gas layer with an equal spaces, wherein the He-3 detector tube is formed in an inside of the body so as to surround the sample cavity.

A lower surface of the annular gas layer may be connected with each other at the lower portion of the body, and the neutron counter may further includes an upper lid for covering the sample cavity, wherein the upper lid includes a carbon layer.

Partitions may be formed between the anode rods with equal angular spaces and the partition may be formed of the same material as the metal material of a ground electrode. A radial thickness of the annular gas layer may vary from the upper portion to the lower portion of the annular gas layer and the radial thickness of the annular gas layer may be thicker at the upper and lower portions of the annular gas layer than the middle portion of the annular gas layer.

The neutron counter may further includes a signal analyzer for analyzing a signal detected in the anode rod, wherein the signal analyzer has a function that can receive individually the signal detected in each anode rod through a signal relay and a function that can receive integrately signals detected from all anode rods.

DESCRIPTION TO MAIN ELEMENTS OF THE DRAWINGS

10: He-3 detector tube
10A: inside wall
10B: outside wall
20: anode rod
30: Cd layer
40: SUS layer
50: sample of nuclear material
60: upper lid
70: lower base
80: preamplifier
90: annular gas layer
100: first well type neutron counter
110: partition
120: Pb layer
130: carbon layer
140: signal analyzer connection part
200: second well type neutron counter

BEST MODE FOR CARRYING OUT THE INVENTION

Practical and presently preferred embodiments of the present invention are illustrative with reference to accompanied drawings.

However, it will be appreciated that those skilled in the art, on consideration of this disclosure, may make modifications and improvements within the spirit and scope of the present invention.

Figure 2:
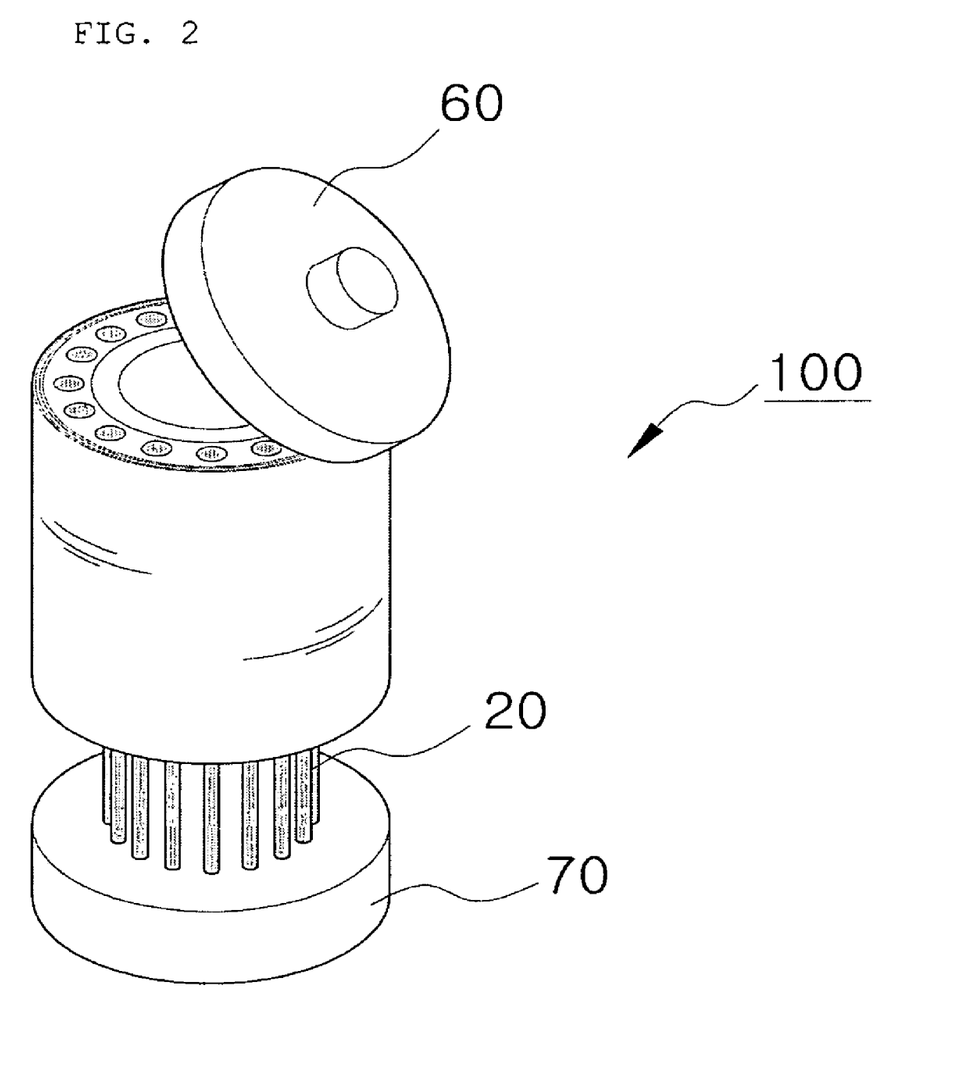
FIG. 2 is a perspective view illustrating a first well type neutron counter containing a He-3 detector tube including single annular gas layer according to an embodiment of the present invention.

FIG. 2 is a perspective view illustrating a first well type neutron counter containing a He-3 detector tube including single annular gas layer according to an embodiment of the present invention. Referring to FIG. 2, the first well type neutron counter 100 contains an upper lid 60 and a lower base 70 at upper and lower portions thereof, which serves as a neutron reflector, respectively, and a single gas layer therein, which has a hollow circumferential shape. A plurality of electrodes 20 are equipped in the single gas layer.

Figure 3:
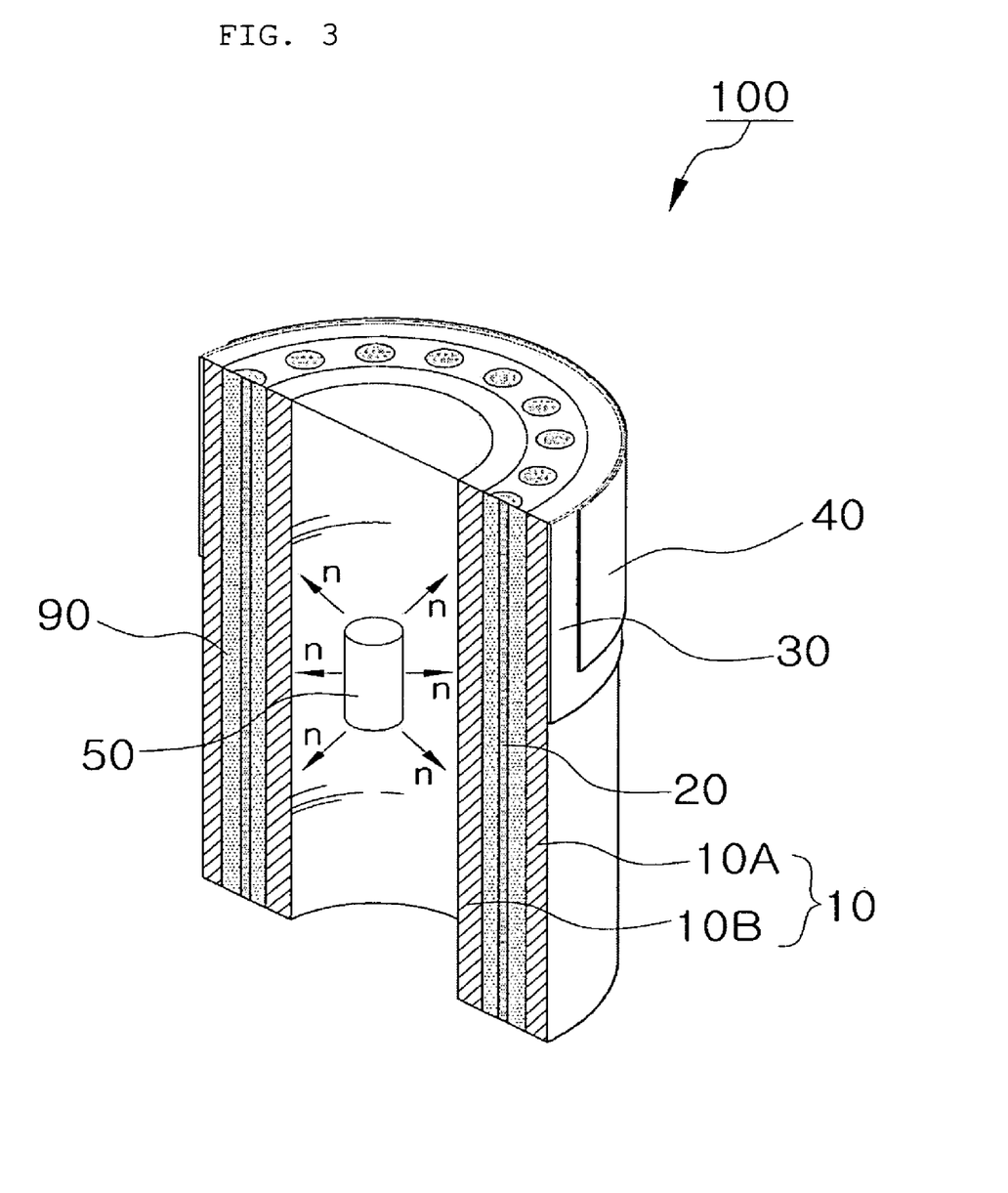
FIG. 3 is a cross-sectional perspective view illustrating inside and outside structures of the first well type neutron counter according to an embodiment of the present invention.

FIG. 3 is a cross-sectional perspective view illustrating inside and outside structures of the first well type neutron counter according to an embodiment of the present invention. Referring to FIG. 3, at the center of the first well type neutron counter 100, a neutron source or a sample 50 of spent nuclear fuel, which irradiates neutron, is inserted. An annular He-3 detector tube including a single annular gas layer 90 for injecting He-3 gas therein is provided around the sample 50 and the He-3 gas is filled in the annular gas layer 90 of the He-3 detector tube.

Further, a plurality of electrodes, i.e. anode rods 20 are arranged in circumferential direction in the annular gas layer 90 of the He-3 detector tube. Each of the anode rods 20 is equipped in a longitudinal direction of the He-3 detector tube. The anode rods 20 may be various sizes of from several μm to several mm according to the scale or structure of the first well type neutron counter. The He-3 detector tube is formed of a polyethylene neutron moderator. A Cd panel 30 surrounds a outer wall of the He-3 detector tube to absorb thermal neutrons from the outside and thus block entry of the thermal neutrons into the inside of the counter. Further, a SUS panel 40 is provided outside of the Cd panel 30 to protect the counter.

Figure 4:
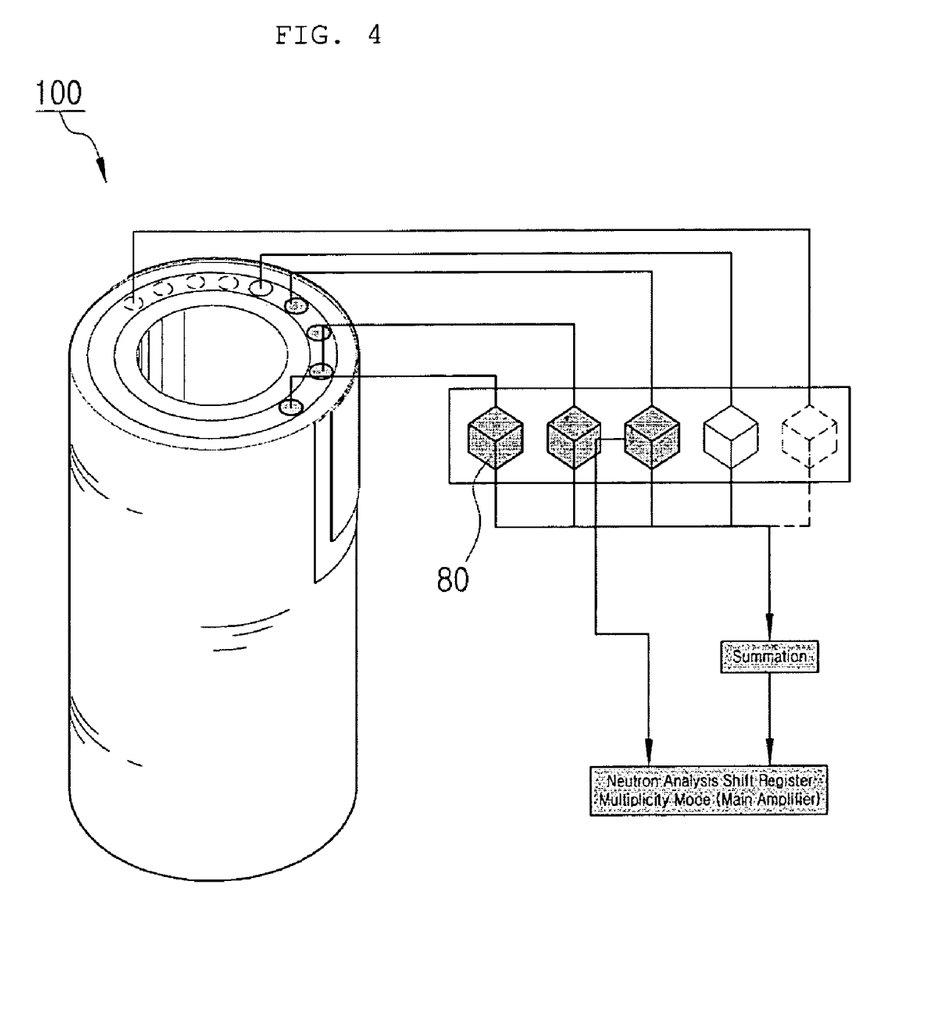
FIG. 4 is a schematic view of a measuring system, in which electric connections of the first well type neutron counter according to an embodiment of the present invention are shown.

FIG. 4 is a schematic view of a measuring system, in which electric connections of the first well type neutron counter according to an embodiment of the present invention are shown. Referring to FIG. 4, the first well type neutron counter 100 according to an embodiment of the present invention may be connected with a signal analyzer, which is an electronic device, for analyzing electric signal generated in the He-3 detector tube. The first well type neutron counter according to an embodiment of the present invention includes a sample cavity for inserting nuclear material sample therein, and a neutron generated from the nuclear material sample passes through the inside neutron moderator 10B of the two layered annular walls of polyethylene and then reacts with He-3 inside the gas layer to produce a proton and a tritium nucleus. These two charged particles ionize the gas filled in the gas layer and resultantly generated electron causes an electrical avalanche during its movement to the anode (i.e. anode rod 20), thereby resulting in a flow of electricity. The electric signals may be individually counted or be counted by summing up after the amplification by a preamplifier 80 included in the signal analyzer.

Figure 5:
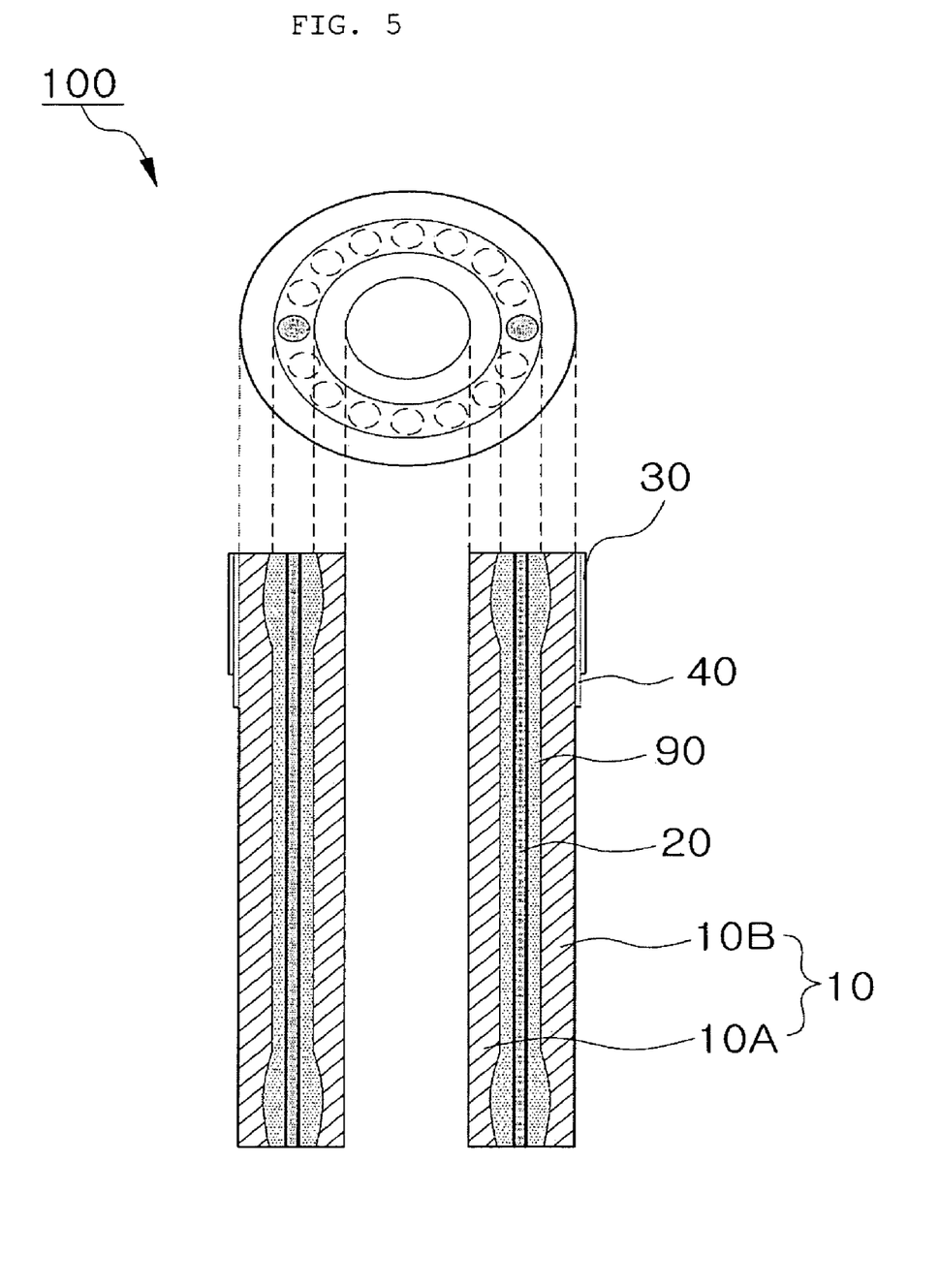
FIG. 5 is a detailed view illustrating a plan and across-section of the first well type neutron counter according to an embodiment of the present invention.

FIG. 5 is a detailed view illustrating a plan and across-section of the first well type neutron counter according to an embodiment of the present invention. Referring to FIG. 5, the gas layer 90 included in the He-3 detector tube of the first well type neutron counter 100 may be designed so that its radial width is relatively thicker at the upper and lower portions than the middle portion. If the gas layer has the same thickness at every portion, smaller amount of neutrons irradiated from the sample is transferred to the detector tube when the sample is placed at the upper or lower portion, compared that the sample is placed at the middle portion. Therefore, the detection value varies as the position of sample even though the same sample is used. In order to prevent such ununiformity, the upper and lower portions of the gas layer 90 included in the He-3 detector tube are become to be wider than the middle portion.

Figure 6:
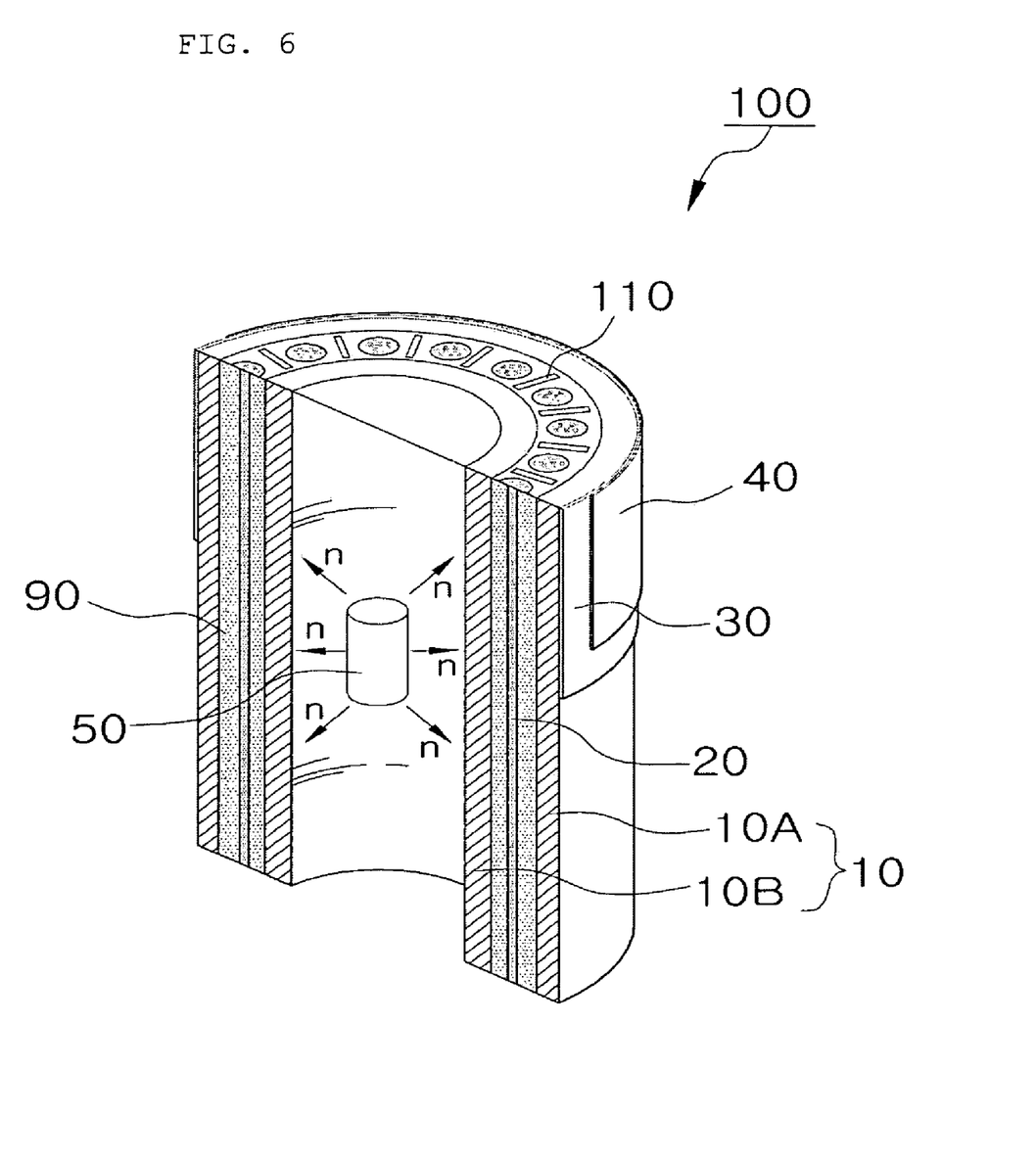
FIG. 6 is a schematic view illustrating that partitions are installed in the annular gas layer of the first well type neutron counter according to an embodiment of the present invention.

FIG. 6 is a schematic view illustrating that partitions are installed in the annular gas layer of the first well type neutron counter according to an embodiment of the present invention. Referring to FIG. 6, the He-3 detector tube of the first well type neutron counter 100 may include the annular gas layer 90 having partitions 110 installed therein. That is, the anode rods 20 are installed in the longitudinal direction with an equal space and the partition is provided between adjacent two anode rods 20 so that each anode rod 20 forms a separate cell. The partition 110 provided inside the annular gas layer 90 of the He-3 detector tube may be formed of the same material as the metal material of a ground electrode for grounding the electricity generated in the He-3 detector tube, thereby capable of enhancing detection signal.

Figure 7:
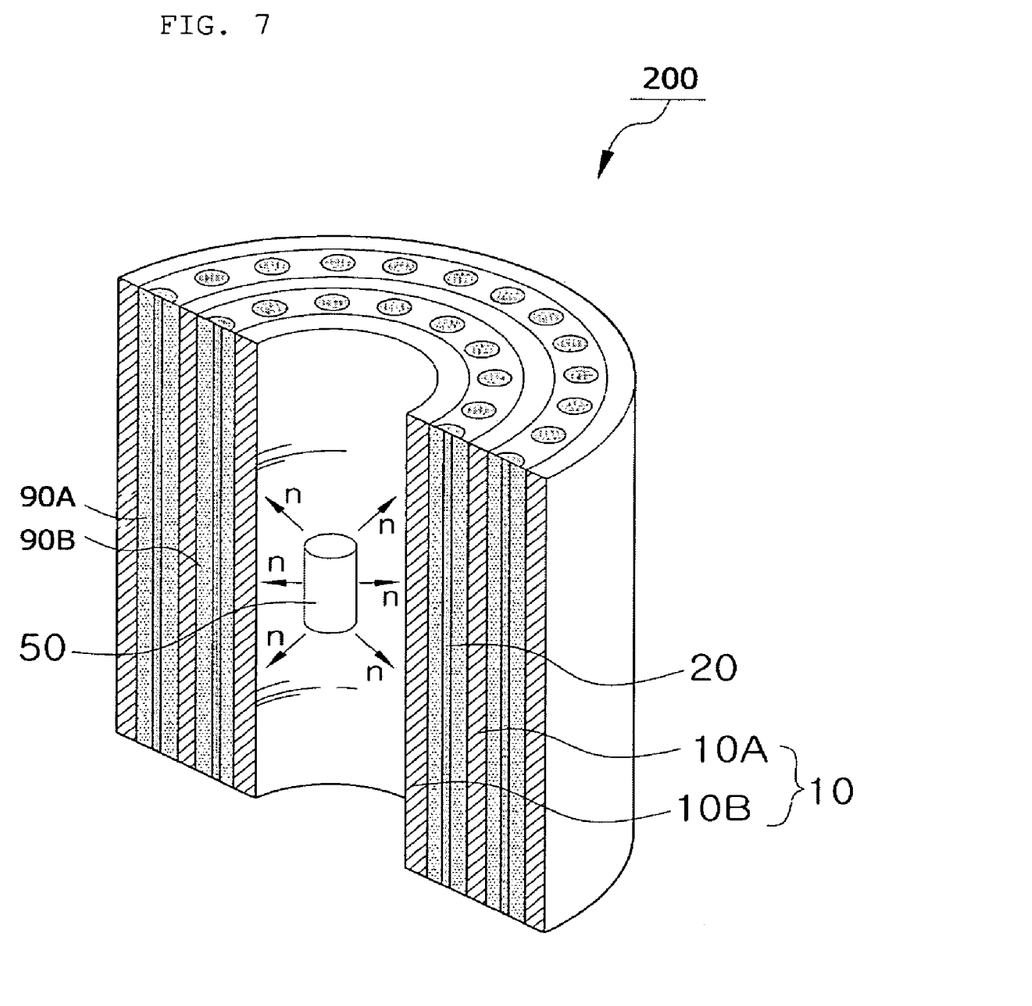
FIG. 7 is a perspective view illustrating a second well type neutron counter containing a He-3 detector tube including a plurality of annular gas layers according to an embodiment of the present invention.

FIG. 7 is a perspective view illustrating a second well type neutron counter containing a He-3 detector tube including a plurality of annular gas layers according to an embodiment of the present invention. Referring to FIG. 7, the He-3 detector tube of the second well type neutron counter 200 is similar to the He-3 detector tube of the first well type neutron counter 100 shown in FIG. 3, which includes single annular gas layer 90, except for the number of the annular gas layer 90. The He-3 detector tube of the second well type neutron counter 200 includes a plurality of annular gas layers 90 and anode rods 20 are installed in the longitudinal direction with an equal space in each annular gas layer 90. Therefore, a neutron irradiated from the sample passes through the inside neutron moderator 10B and then reacts with He-3 in the first gas layer 90B to produce a proton and a tritium nucleus, and a neutron passes through the inside neutron moderator 10B and a middle neutron moderator 10A reacts with He-3 in the second gas layer 90A to produce a proton and a tritium nucleus.

Although the He-3 detector tube including two annular gas layers 90 is shown in FIG. 7, the present invention may include a well type neutron counter 200 containing a He-3 detector tube including a plurality of the annular gas layers 90. The specific structure of the inside of the second well type neutron counter 200 will be described with reference to FIG. 8.

Figure 8:
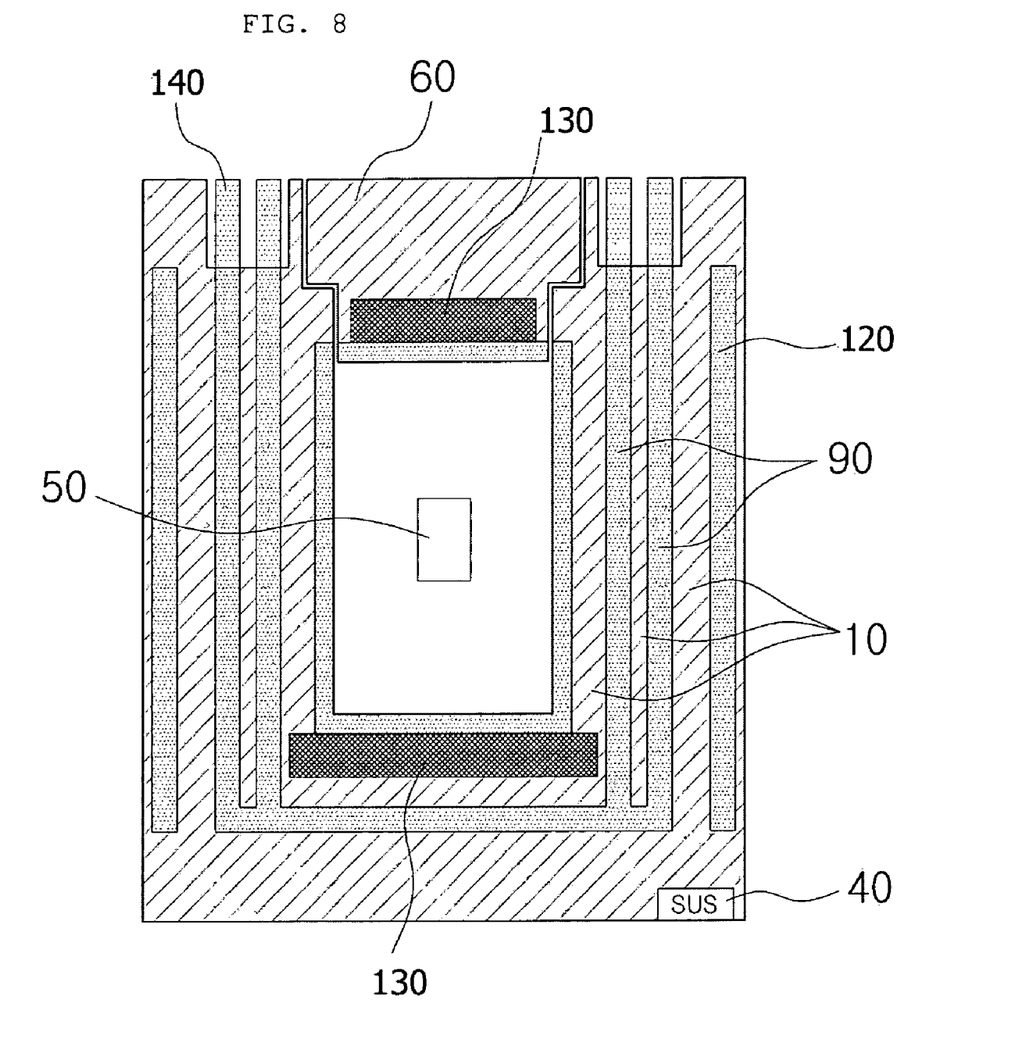
FIG. 8 is a cross-sectional view illustrating the second well type neutron counter containing a He-3 detector tube including a plurality of annular gas layers according to an embodiment of the present invention.

FIG. 8 is a cross-sectional view illustrating the second well type neutron counter containing a He-3 detector tube including a plurality of annular gas layers according to an embodiment of the present invention. Referring to FIG. 8, like the first well type neutron counter 100, the second well type neutron counter 200 includes a sample cavity for injecting a nuclear material sample therein at the center of the counter. The He-3 detector tube of the second well type neutron counter 200 includes a plurality of annular gas layers 90 and lower surfaces of the plurality of annular gas layers 90 can be connected with each other at the lower portion of the He-3 detector tube. Although the second well type neutron counter 200 alone is shown in FIG. 8, a lower surface of the single annular gas layer 90 included in the first well type neutron counter 100 can also be connected with each other. Also, the second well type neutron counter 200 may include at least one graphite layer 130 with high moderation ability and the graphite layer 130 may be placed between the gas layer 90 and a lower portion of the sample cavity and in an inside of the upper lid 60. However, in the present invention, the location of the graphite layer 130 is not limited thereto. Also, the second well type neutron counter 200 may include at least one Pb layer 120 for shielding gamma rays. Similarly, the first well type neutron counter 100 may include the carbon layer and the Pb layer.

Also, the second well type neutron counter 200 includes a signal analyzer connection part 140 for connecting the second well type neutron counter 200 to a signal analyzer. The function of the signal analyzer connected to the signal analyzer connection part 140 is the same as the signal analyzer described with reference to FIG. 4 and thus specific description will be omitted.

As is apparent from the above description, since a loss of neutrons leaked between detectors tubes can be eliminated, a well type neutron counter according to the present invention has a high efficiency which allows a measurement in a multiplicity mode. Also, since a number of the electrodes are significantly reduced, the size is largely reduced, the well type neutron counter according to the present invention has a largely reduced size, a simplified structure and a resultant reduced failure rate, as compared to the conventional counter in which the He-3 detector tubes are arranged in the form of three or four rings to obtain high efficiency and thus its volume is very large.

Further, in the well type neutron counter according to the present invention, since the partition provided in the annular gas layer of the He-3 detector tube is formed of the same material as the metal material of a ground electrode and therefore one electrode can be inserted in each partition, an efficiency of the detection signal can be increased.

Furthermore, since the well type neutron counter according to the present invention is designed so as to individually receive a signal from the single electrode by utilizing a relay device in an actual measurement, it is possible to measure relative strength of the neutron from each radial direction and thus to measure a directivity of the neutron generated from the sample, and it is also possible, when an obtainment of a number of total neutrons is needed, to utilize a signal analyzer which integrates neutron detection signals obtained from each of the electrodes.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A well type neutron counter containing an annular He-3 detector tube, comprising:
    a body formed of a neutron moderator and having a sample cavity for inserting a sample of nuclear material therein; and
    an annular He-3 detector tube including at least one annular gas layer into which He-3 gas is injected and a plurality of anode rods standing in the annular gas layer at equal spacing,
    wherein the He-3 detector tube is formed in an inside of the body so as to surround the sample cavity.

2. The well type neutron counter containing an annular He-3 detector tube as set forth in claim 1, wherein lower surfaces of the annular gas layer is connected with each other at the lower portion of the body.

3. The well type neutron counter containing an annular He-3 detector tube as set forth in claim 1, further comprising a carbon layer for moderating neutrons irradiated from the nuclear material sample between a lower surface of the sample cavity and the gas layer.

4. The well type neutron counter containing an annular He-3 detector tube as set forth in claim 3, further comprising an upper lid for covering the sample cavity, wherein the upper lid includes a carbon layer.

5. The well type neutron counter containing an annular He-3 detector tube as set forth in claim 1, wherein partitions are formed between the anode rods with equal angular spaces.

6. The well type neutron counter containing an annular He-3 detector tube as set forth in claim 5, wherein the partition is formed of the same material as the metal material of a ground electrode.

7. The well type neutron counter containing an annular He-3 detector tube as set forth in claim 1, wherein a radial thickness of the annular gas layer varies from the upper portion to the lower portion of the annular gas layer.

8. The well type neutron counter containing an annular He-3 detector tube as set forth in claim 7, wherein the radial thickness of the annular gas layer is thicker at the upper and lower portions of the annular gas layer than the middle portion of the annular gas layer.

9. The well type neutron counter containing an annular He-3 detector tube as set forth in claim 1, further comprising a signal analyzer for analyzing a signal detected in the anode rod,
wherein the signal analyzer has a function that can receive individually the signal detected in each anode rod through a signal relay and a function that can receive integrately signals detected from all anode rods.

10. The well type neutron counter containing an annular He-3 detector tube as set forth in claim 2, wherein partitions are formed between the anode rods with equal angular spaces.

11. The well type neutron counter containing an annular He-3 detector tube as set forth in claim 2, wherein a radial thickness of the annular gas layer varies from the upper portion to the lower portion of the annular gas layer.

12. The well type neutron counter containing an annular He-3 detector tube as set forth in claim 2, further comprising a signal analyzer for analyzing a signal detected in the anode rod,
wherein the signal analyzer has a function that can receive individually the signal detected in each anode rod through a signal relay and a function that can receive integrately signals detected from all anode rods.

* * * * *